(12) United States Patent
Devilbiss

(10) Patent No.: US 7,119,693 B1
(45) Date of Patent: Oct. 10, 2006

(54) INTEGRATED CIRCUIT WITH ENHANCED COUPLING

(75) Inventor: Alan D. Devilbiss, Colorado Springs, CO (US)

(73) Assignee: Celis Semiconductor Corp., Colorado Springs, CO (US)

(*) Notice: Subject to any disclaimer, the term of this patent is extended or adjusted under 35 U.S.C. 154(b) by 0 days.

(21) Appl. No.: 10/099,012

(22) Filed: Mar. 13, 2002

(51) Int. Cl.
*G08B 13/14* (2006.01)

(52) U.S. Cl. .......................... 340/572.5; 340/572.6; 340/572.7

(58) Field of Classification Search .......... 340/572.7, 340/572.1, 572.5, 572.6; 343/741, 742, 878, 343/893, 895, 904
See application file for complete search history.

(56) References Cited

U.S. PATENT DOCUMENTS 5,095,240 A * 3/1992 Nysen et al. ............ 310/313 R
5,654,693 A * 8/1997 Cocita ..................... 340/572.1
6,154,137 A * 11/2000 Goff et al. ............... 340/572.4
6,837,438 B1 1/2005 Takasugi et al.

* cited by examiner

*Primary Examiner*—Thomas J Mullen
(74) *Attorney, Agent, or Firm*—Mark G. Pannell; Hanes & Schutz, LLC

(57) ABSTRACT

A system for conveying a radio frequency (RF) signal from a base station to a detached integrated circuit (IC) has an intermediate resonant circuit and an IC. The intermediate resonant circuit is configured to resonate in response to the RF signal from the base station, reproducing the RF signal. The IC has an integral resonant circuit configured to resonate in response to the reproduced RF signal. The IC and the intermediate resonant circuit are affixed proximate each other. Both are separate from the base station and each other. Either or both of the intermediate resonant circuit and the integral resonant circuit may contact a high magnetic permeability layer. The intermediate resonant circuit may be formed of conductive ink.

48 Claims, 1 Drawing Sheet

INTEGRATED CIRCUIT WITH ENHANCED COUPLING

FIELD OF THE INVENTION

This invention relates in general to signal coupling enhancement, and more particularly, to a system for relaying a signal to an integrated circuit.

BACKGROUND OF THE INVENTION

Radio Frequency Identification (RFID) transponders (tags) are generally used in conjunction with an RFID base station, typically in applications such as inventory control, security, access cards, and personal identification. The base station transmits a carrier signal that powers circuitry in the RFID tag when it is brought within a read range of the base station. Data communication between the tag and the station is achieved by modulating the amplitude of the carrier signal with a binary data pattern, usually amplitude shift keying. To that end, RFID tags are typically integrated circuits that include, among other components, antenna elements for coupling the radiated field, rectifiers to convert the AC carrier signal to DC power, and demodulators to extract the data pattern from the envelope of the carrier signal.

If fabricated at sufficiently low cost, RFID tags can also be useful in cost-sensitive applications such as product pricing, baggage tracking, parcel tracking, asset identification, authentication of paper money, and animal identification, to mention just a few examples. RFID tags could provide significant advantages over systems conventionally used for such applications, such as bar code identification systems. For example, a basket full of items marked with RFID tags could be read rapidly without having to handle each item, whereas they would have to be handled individually when using a bar code system. Other advantages of RFID tags over bar codes include higher read speed, less susceptibility to problems such as dirt obscuring a portion of the code, no requirement of exact alignment with the label, and no requirement of line of sight. Unlike bar codes, RFID tags provide the ability to update information on the tag. Nevertheless, conventional RFID technology is too expensive for dominant use in such applications.

RFID tags may be active or passive. While active RFID tags contain their own power source, passive RFID tags obtain their power from an RF field radiated by the base station. Passive RFID tags are substantially less expensive than active RFID tags, making passive RFID tags a good choice for low cost applications. However, passive field powered RFID tags require at least an order of magnitude more power in the interrogation signal from the base station than an active RFID tag.

Even conventional passive RFID tags are too expensive for dominant use in applications dominated by bar codes today. A major factor driving up fabrication costs of RFID tags is the size of the silicon integrated circuit that makes up the tag. Passive RFID tags generally have an external antenna element for coupling the radiated field. Conventionally, the external antenna element is physically bonded to the RFID tag. Conventional RFID tags require at least two pads large enough to bond wire for the attachment of the external antenna coil. Since RFID tag chips are generally relatively small compared to the size of a bond pad, these bond pads consume a significant percentage of the integrated circuit area of a conventional RFID tag.

One prior solution for reducing the number of bond pads on a passive RFID tag chip includes a thin film antenna included on the integrated circuit. This method eliminates the need for the bonding pads, thereby decreasing the silicon surface area and consequently the fabrication cost. Eliminating the wire bonding process further reduces fabrication costs. However, since such integrated antennas are form-factor constrained and are necessarily small, the coupling efficiency to the radiated field substantially reduced in RFID tags with an internal antenna. Consequently, this method often results in exceedingly short operating read distances from the base station.

Increasing the transmitted power of the field radiated by the base station can increase the operating read distance. However, maximum levels permissible are limited by government regulation.

SUMMARY OF THE INVENTION

According to principles of the present invention, a system for increasing the coupling efficiency between an integrated circuit (IC) and a base station includes two resonant circuits. A first resonant circuit is formed in the IC as an integral part of the fabrication of the integrated circuit process. A second resonant circuit is not electrically connected to the first resonant circuit, but is positioned as to optimize coupling of the radiated fields between the two resonant circuits. The second resonant circuit is further optimized to couple the radiated field from the base station. Accordingly, the radiated field from the base station couples to the second resonant circuit, which in turn couples to the first resonant circuit.

According to further principles of the present invention, a system for conveying a radio frequency (RF) signal from a base station to a detached integrated circuit (IC) has an intermediate resonant circuit and an IC. The intermediate resonant circuit is configured to resonate in response to the RF signal from the base station, reproducing the RF signal. The IC has an integral resonant circuit configured to resonate in response to the reproduced RF signal. The IC and the intermediate resonant circuit are affixed proximate each other. Both are separate from the base station and each other. Either or both of the intermediate resonant circuit and the integral resonant circuit may contact a high magnetic permeability layer. The intermediate resonant circuit may be formed of conductive ink.

DETAILED DESCRIPTION OF THE INVENTION

Figure 1:
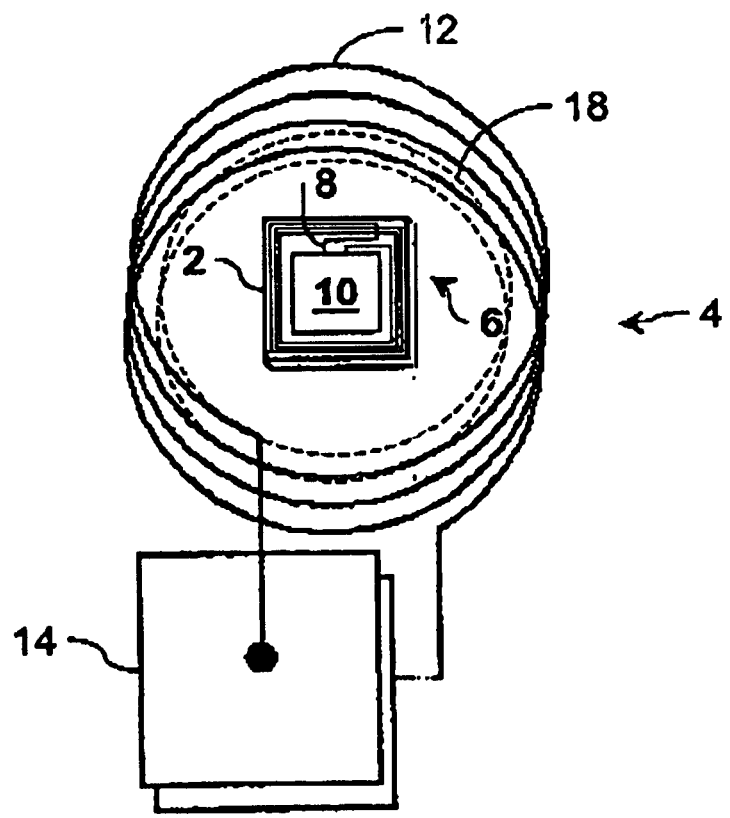
FIG. 1 is a diagrammatic illustration of one embodiment of the present invention system.

FIG. 1 illustrates one embodiment of the present invention system for conveying a radio frequency (RF) signal to an integrated circuit (IC). In one embodiment, the RF signal is generated by a base station (not shown). Alternatively, the RF signal is generated by any device for communicating with the IC.

The system includes IC 2 and intermediate resonant circuit 4. IC 2 and intermediate resonant circuit 4 are affixed proximate one another. The proximity is selected based on the characteristics of the IC 2, intermediate resonant circuit 4, and the RF signal.

IC 2 is an integrated circuit device for performing any desired function. IC 2 includes integral resonant circuit 6 and integrated circuitry (not shown) necessary for performing the desired function. In one embodiment, IC 2 is an RFID tag.

Integral resonant circuit 6 is any component or combination of components configured to resonate in response to an RF signal and to provide an electrical signal to the integrated circuitry of IC 2. In one embodiment, integral resonant circuit 6 is a passive circuit including integral inductive antenna element 8 and integral capacitive element 10 which together resonate in response to an RF signal.

Integral inductive antenna element 8 is any component integral to IC 2 acting as an inductive antenna coil. Integral capacitive element 10 is any component integral to IC 2 having capacitance. The inductance and capacitance of integral inductive antenna element 8 and integral capacitive element 10 is selected based on the frequency of the RF signal.

Intermediate resonant circuit 4 is any component or combination of components configured to resonate in response to an RF signal and to reproducing the RF signal. The RF signal is need not be reproduced exactly to practice the present invention. In one embodiment, the RF signal is reproduced with a greater amplitude than the amplitude of the original RF signal at the intermediate resonant circuit 4. In one embodiment, intermediate resonant circuit 4 is a passive circuit including intermediate inductive antenna element 12 and intermediate capacitive element 14 which together resonate in response to an RF signal.

Intermediate inductive antenna element 12 is any component acting as an inductive antenna coil. Intermediate capacitive element 14 is any component having capacitance. The inductance and capacitance of intermediate inductive antenna element 12 and intermediate capacitive element 14 is selected based on the frequency of the RF signal.

In one embodiment, inductive antenna element 12 and intermediate capacitive element 14 are discrete components. In an alternate embodiment, inductive antenna element 12 and intermediate capacitive element 14 are discrete components printed with conductive ink, etched or stamped with conductive foil, or otherwise formed on a flexible and bendable substrate such as paper, thin plastic, or polypropylene sheets. IC 2 may then be adhered utilizing pressure sensitive adhesive or some other adhesive to the vicinity of inductive antenna element 12 and intermediate capacitive element 14.

When the system of the present invention is brought within reading distance of a base station radiating a RF carrier signal, intermediate resonant circuit 4 will resonate. This resonant frequency will couple to integral resonant circuit 6 on IC 2. The effective coupling efficiency of the carrier signal radiated from the base station to IC 2 is significantly improved due to the presence of intermediate resonant circuit 4.

Figure 2:
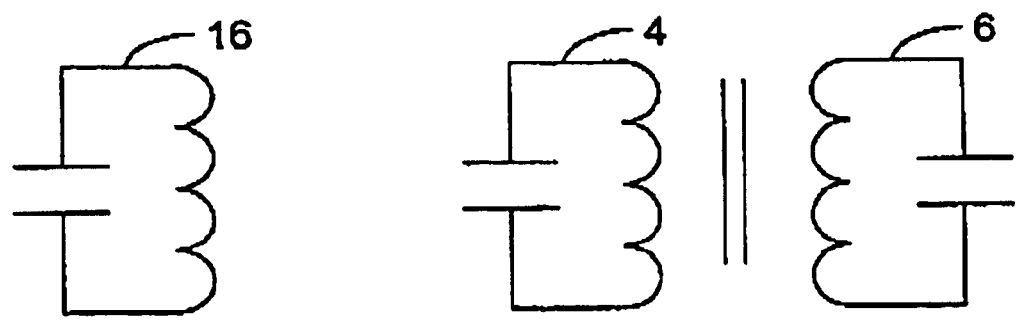
FIG. 2 is a schematic illustration of the system shown in FIG. 1.

FIG. 2 is a schematic illustration of the system shown in FIG. 1. FIG. 2 shows integral resonant circuit 6, intermediate resonant circuit 4, and RF signal generating circuit 16. Since IC 2 is proximate intermediate resonant circuit 4, the coupling between integral resonant circuit 6 and intermediate resonant circuit 4 is close and constant, optimal conditions for maximum coupling efficiency. This coupling efficiency can be further enhanced by utilizing a high magnetic permeability layer 18 on IC 2 or by encasing IC 2 in a high magnetic permeability material.

The coupling efficiency between RF signal generating circuit 16 and intermediate resonant circuit 4 is less predictable and possibly less efficient since the distance between RF signal generating circuit 16 and intermediate resonant circuit 4 can vary. However, components that make up RF signal generating circuit 16 and intermediate resonant circuit 4 are not constrained by the form factor limitations of the integrated circuit environment of integral resonant circuit 6. Therefore, components that make up RF signal generating circuit 16 and intermediate resonant circuit 4 may be made as large as necessary and desired.

One advantage of the present invention is that the present invention utilizes IC 2 in which all components of integral resonant circuit 6 are formed as an integral part of the integrated circuit process, thereby taking advantage of no wire bond pads, while extending the read distance.

The foregoing description is only illustrative of the invention. Various alternatives and modifications can be devised by those skilled in the art without departing from the invention. In particular, wherever a device is connect or coupled to another device, additional devices may be present between the two connected devices. Accordingly, the present invention embraces all such alternatives, modifications, and variances that fall within the scope of the appended claims.

What is claimed is:

1. A system for conveying a radio frequency (RF) signal to an integrated circuit, the system comprising:
   (a) an intermediate resonant circuit configured to resonate in response to an RF signal, reproducing the RF signal, the intermediate resonant circuit including an inductive antenna element, a capacitive element, and a high magnetic permeability layer contacting the inductive antenna element; and,
   (b) an integrated circuit (IC) affixed proximate the intermediate resonant circuit, the IC separate from the intermediate resonant circuit, the IC having an integral resonant circuit configured to resonate in response to the reproduced RF signal.

2. The system of claim 1 wherein the intermediate resonant circuit is passive.

3. The system of claim 1 wherein the intermediate resonant circuit includes at least one circuit component formed of conductive ink.

4. The system of claim 1 wherein the integral resonant circuit is passive.

5. The system of claim 1 wherein the integral resonant circuit includes an inductive antenna element and a capacitive element.

6. The system of claim 5 wherein the integral resonant circuit further includes a high magnetic permeability layer contacting the inductive antenna element.

7. A system for conveying a radio frequency (RF) signal to an integrated circuit, the system comprising:
   (a) an integrated circuit (IC) having an integral resonant circuit configured to resonate in response to an RF signal and provide the RF signal to the IC; and,
   (b) an intermediate resonant circuit affixed proximate the integral resonant circuit external to and separate from the IC, the intermediate resonant circuit configured to resonate in response to an RF signal, reproducing the RF signal, the intermediate resonant circuit including an inductive antenna element, a capacitive element, and a high magnetic permeability layer contacting the inductive antenna element.

8. The system of claim 7 wherein the intermediate resonant circuit is passive.

9. The system of claim 7 wherein the intermediate resonant circuit includes at least one circuit component formed of conductive ink.

10. The system of claim 7 wherein the integral resonant circuit is passive.

11. The system of claim 7 wherein the integral resonant circuit includes an inductive antenna element and a capacitive element.

12. The system of claim 11 wherein the integral resonant circuit further includes a high magnetic permeability layer contacting the inductive antenna element.

13. A system for conveying a radio frequency (RF) signal from a base station to a detached integrated circuit the system comprising:

(a) an intermediate resonant circuit configured to resonate in response to an RF signal from the base station, reproducing the RF signal, the intermediate resonant circuit including an inductive antenna element, a capacitive element, and a high magnetic permeability layer contacting the inductive antenna element; and, (b) an integrated circuit (IC) affixed proximate the intermediate resonant circuit, the IC separate from the intermediate resonant circuit and the base station, the IC having an integral resonant circuit configured to resonate in response to the reproduced RF signal.

14. The system of claim 13 wherein the intermediate resonant circuit is passive.

15. The system of claim 13 wherein the intermediate resonant circuit includes at least one circuit component formed of conductive ink.

16. The system of claim 13 wherein the integral resonant circuit is passive.

17. The system of claim 13 wherein the integral resonant circuit includes an inductive antenna element and a capacitive element.

18. The system of claim 17 wherein the integral resonant circuit further includes a high permeability layer contacting the inductive antenna element.

19. A system for conveying a radio frequency (RF) signal to an integrated circuit, the system comprising:

(a) an intermediate resonant circuit configured to resonate in response to an RF signal, reproducing the RF signal, the intermediate resonant circuit including at least one circuit component formed of conductive ink; and, (b) an integrated circuit (IC) affixed proximate the intermediate resonant circuit, the IC separate from the intermediate resonant circuit, the IC having an integral resonant circuit configured to resonate in response to the reproduced RF signal.

20. The system of claim 19 wherein the intermediate resonant circuit is passive.

21. The system of claim 19 wherein the intermediate resonant circuit includes an inductive antenna element and a capacitive element.

22. The system of claim 19 wherein the integral resonant circuit is passive.

23. The system of claim 19 wherein the integral resonant circuit includes an inductive antenna element and a capacitive element.

24. The system of claim 23 wherein the integral resonant circuit further includes a high magnetic permeability layer contacting the inductive antenna element.

25. A system for conveying a radio frequency (RF) signal to an integrated circuit, the system comprising:

(a) an integrated circuit (IC) having an integral resonant circuit configured to resonate in response to an RF signal and provide the RF signal to the IC; and, (b) an intermediate resonant circuit affixed proximate the integral resonant circuit external to and separate from the IC, the intermediate resonant circuit configured to resonate in response to an RF signal, reproducing the RF signal, the intermediate resonant circuit including at least one circuit component formed of conductive ink.

26. The system of claim 25 wherein the intermediate resonant circuit is passive.

27. The system of claim 25 wherein the intermediate resonant circuit includes an inductive antenna element and a capacitive element.

28. The system of claim 25 wherein the integral resonant circuit is passive.

29. The system of claim 25 wherein the integral resonant circuit includes an inductive antenna element and a capacitive element.

30. The system of claim 29 wherein the integral resonant circuit further includes a high magnetic permeability layer contacting the inductive antenna element.

31. A system for conveying a radio frequency (RF) signal from a base station to a detached integrated circuit, the system comprising:

(a) an intermediate resonant circuit configured to resonate in response to an RF signal from the base station, reproducing the RF signal, the intermediate resonant circuit including at least one circuit component formed of conductive ink; and, (b) an integrated circuit (IC) affixed proximate the intermediate resonant circuit, the IC separate from the intermediate resonant circuit and the base station, the IC having an integral resonant circuit configured to resonate in response to the reproduced RF signal.

32. The system of claim 31 wherein the intermediate resonant circuit is passive.

33. The system of claim 31 wherein the intermediate resonant circuit includes an inductive antenna element and a capacitive element.

34. The system of claim 31 wherein the integral resonant circuit is passive.

35. The system of claim 31 wherein the integral resonant circuit includes an inductive antenna element and a capacitive element.

36. The system of claim 35 wherein the integral resonant circuit further includes a high magnetic permeability layer contacting the inductive antenna element.

37. A system for conveying a radio frequency (RF) signal to an integrated circuit, the system comprising:

(a) an intermediate resonant circuit configured to resonate in response to an RF signal, reproducing the RF signal; and, (b) an integrated circuit (IC) affixed proximate the intermediate resonant circuit, the IC separate from the intermediate resonant circuit, the IC having an integral resonant circuit configured to resonate in response to the reproduced RF signal, the integral resonant circuit including an inductive antenna element, a capacitive element, and a high magnetic permeability layer contacting the inductive antenna element.

38. The system of claim 37 wherein the intermediate resonant circuit is passive.

39. The system of claim 37 wherein the intermediate resonant circuit includes an inductive antenna element and a capacitive element.

40. The system of claim 37 wherein the integral resonant circuit is passive.

41. A system for conveying a radio frequency (RF) signal to an integrated circuit, the system comprising:

(a) an integrated circuit (IC) having an integral resonant circuit configured to resonate in response to an RF signal and provide the RF signal to the IC, the integral resonant circuit including an inductive antenna element, a capacitive element, and a high magnetic permeability layer contacting the inductive antenna element; and, (b) an intermediate resonant circuit affixed proximate the integral resonant circuit external to and separate from the IC, the intermediate resonant circuit configured to resonate in response to an RE signal, reproducing the RF signal.

42. The system of claim 41 wherein the intermediate resonant circuit is passive.

43. The system of claim 41 wherein the intermediate resonant circuit includes an inductive antenna element and a capacitive element.

44. The system of claim 41 wherein the integral resonant circuit is passive.

45. A system for conveying a radio frequency (RF) signal from a base station to a detached integrated circuit, the system comprising:

(a) an intermediate resonant circuit configured to resonate in response to an RF signal from the base station, reproducing the RF signal; and, (b) an integrated circuit (IC) affixed proximate the intermediate resonant circuit, the IC separate from the intermediate resonant circuit and the base station, the IC having an integral resonant circuit configured to resonate in response to the reproduced RF signal, the integral resonant circuit including an inductive antenna element, a capacitive element, and a high magnetic permeability layer contacting the inductive antenna element.

46. The system of claim 45 wherein the intermediate resonant circuit is passive.

47. The system of claim 45 wherein the intermediate resonant circuit includes an inductive antenna element and a capacitive element.

48. The system of claim 45 wherein the integral resonant circuit is passive.

* * * * *